United States Patent [19]

Rankin, Jr.

[11] Patent Number: 4,515,108

[45] Date of Patent: May 7, 1985

[54] BIRD NESTING HABITAT

[76] Inventor: Henry Rankin, Jr., 505 Valley Rd., Fayetteville, N.C. 28305

[21] Appl. No.: 592,293

[22] Filed: Mar. 22, 1984

[51] Int. Cl.³ .............................................. A01K 31/14
[52] U.S. Cl. ................................................. 119/45 R
[58] Field of Search .......................... 119/23, 45 R, 17; D30/3, 4; 47/80, 67

[56] References Cited

U.S. PATENT DOCUMENTS

| | | | |
|---|---|---|---|
| 1,712,986 | 5/1929 | Favata, Jr. ................................ | 47/80 |
| 1,995,217 | 3/1935 | Nelson .................................... | 47/80 |
| 2,510,721 | 6/1950 | Smith ..................................... | 119/23 |

FOREIGN PATENT DOCUMENTS 526778  9/1940  United Kingdom ............. 119/45 R

Primary Examiner—Hugh R. Chamblee
Attorney, Agent, or Firm—Mills & Coats

[57] ABSTRACT

This invention is a bird nesting chamber disposed within an outer vessel which contains either live, dried or artificial foliage. The bird enters the nesting area through the foliage thereby providing a safe habitat for raising its young.

11 Claims, 2 Drawing Figures

BIRD NESTING HABITAT

FIELD OF INVENTION

This invention relates to ornithology and more particularly to bird nesting habitats.

BACKGROUND OF INVENTION

Since man first began to observe birds in the wild, he has been interested in creating nesting habitats so that the birds would stay in the local area and thus be more readily available for observation. To this end various configurations of bird houses have been developed and many have been successful in attracting certain desired species. Such houses have invariably been out-of-doors where they need to be of substantial, weatherproof construction, which can be expensive and which limit the opportunity to closely observe the birds during their mating, nesting, and family raising phases.

Furthermore, the disparity in size and habits of various species, and the differences in their nesting requirements make it difficult to provide for any significant range of species.

BRIEF DESCRIPTION OF INVENTION

After much research and study into the above-mentioned problems, it has been decided that there is at least one very attractive species which is co-operative and with which we can hope to become very closely associated.

One of the more desirable families of birds are the wrens, which as a group are beautiful birds endowed with varied, cheerful songs, and are of considerable economic important being more than ninety-five percent insectivorous. Even in this group the Carolina wren is outstanding, the largest and the most numerous wren in the Southeastern United States.

It has been observed that the Carolina wren has a predilection for nesting in and around planting where the vegetation affords visual protection, protection by concealment, and while it is expected that blue birds and other cavity nesting birds may make use of the arrangements provided, this patent application is aimed specifically at presenting a nesting site which will attract Carolina wrens, and the idea is that of having a cavity, such as a small nesting box, a gourd, or an open cup, inside an attractive planting, in a hanging basket to be suspended from the ceiling of a porch, or under the eaves of a house, or other somewhat protected place.

Another manifestation of the same idea, which might be more practicable in some situations would be to place the nesting chamber on a shelf or bracket on the wall of a porch or patio with potted flowers or vines close alongside in such a manner as to provide partial concealment.

The above nesting habitat can be disposed under any suitable protective overhang such as covered porches, covered decks, overhanging eaves, or the like. Thus by having overhead protection from the elements and side protection through the foliage, the birds feel secure and will readily nest in the nesting habitat of the present invention.

In view of the above, it is an object of the present invention to provide an improved nesting habitat which eliminates the roof and housing of other artificial nesting habitats.

Another object of the present invention is to provide a bird nesting chamber surrounded by either live foliage, dried foliage, artificial foliage or a combination whereby birds using the same have a hidden nesting habitat.

Another object of the present invention is to provide a bird nesting habitat particularly designed for attracting the Carolina wren, which is known to have an affinity with vegetation.

Another object of the present invention is to provide a nesting habitat for birds which allows ready observation of ingress and egress as well as ready observation of the nesting, hatching and chick rearing processes.

Other objects and advantages of the present invention will become apparent and obvious from a study of the following description and the accompanying drawings which are merely illustrative of such invention.

DETAILED DESCRIPTION OF INVENTION

Figure 1:
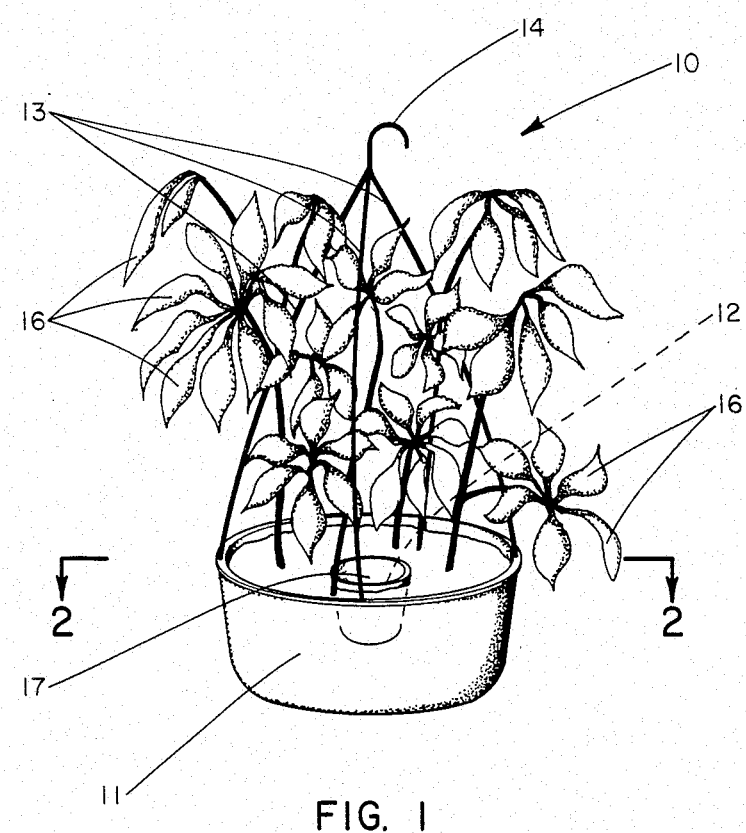
FIG. 1 is a perspective view of the bird nesting means of the present invention.
Figure 2:
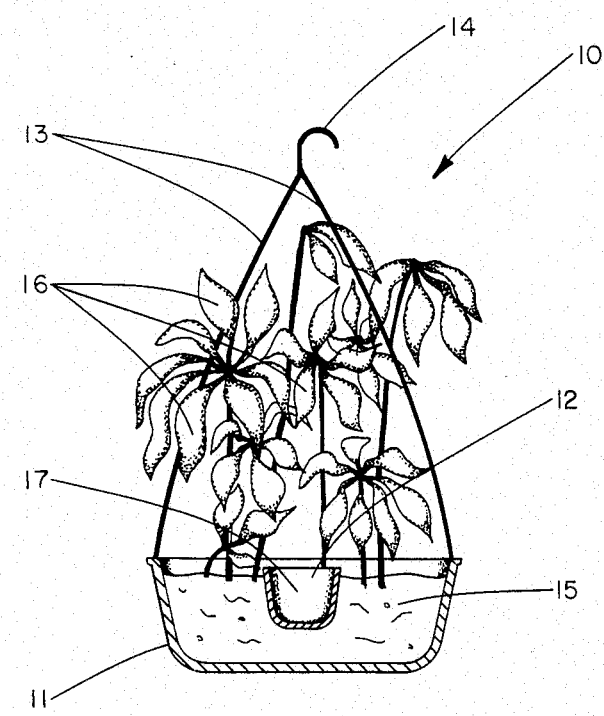
FIG. 2 is a section view taken through lines 2—2 of FIG. 1.

With further reference to the drawings, the bird nesting habitat of the present invention, indicated generally at 10, includes an outer foliage vessel or container 11 and an inner nesting chamber 12. The outer vessel or container can be of any suitable configuration but should be at least ten or twelve inches across. Plastic hanging baskets having a diameter in this range have been found to be suitable for this purpose.

If a hanging basket is used, then a plurality of hanger supports 13 are attached to the outer vessel with a hanger hook 14 being provided at the apex thereof so that the entire habitat can be hung from any suitable hook, bar, or other suitable means (not shown).

Between the outer vessel or container 11 and the inner nesting chamber 12 is a foliage support material 15. This material can be potting soil or other suitable material when the foliage 16 is live or can be one or more pieces of florist oasis which is precut for the purpose when either dried, artificial or cut foliage is used. In the case of the latter, water, of course, would be applied to the oasis material to keep the cut foliage alive longer or in some cases even to root the same.

Whether either live, cut, dried or artificial foliage or a combination thereof is used, the same should be relatively thick and certainly not spriggy. This foliage should be disposed on all sides of the nesting chamber 12 and should even form a foliage canopy thereover. In other words adequate foliage should be used to give the birds a sense of security and yet not so thick as to prevent ready ingress and regress therethrough to the nesting chamber. As the nesting habitat is being formed, it quickly becomes obvious to the person preparing the same when the correct density of foliage has been achieved.

The nesting chamber 12 can be formed from any suitable material. If other than dried oasis with dried or artificial foliage is used, the chamber should be waterproof to prevent moisture from penetrating into the central nesting area 17. Various types of plastic and similar materials are, of course, suitable for this purpose.

Since Carolina wrens are relatively small birds, a nesting chamber of two and a half to four inches in diameter is preferable. The chamber may be open at the top, or, in a situation where exposed to wind-blown rain, a small box, or a gourd with a side-opening entrance would be preferred.

Since Carolina wrens in the mid-Atlantic States begin looking for nesting areas in late February or early March, evergreens or other cold resistant foliage should be used when preparing the habitat with live foliage. Since Carolina wrens usually raise more than one brood per year, as the weather warms additional habitats can be put out with warm weather foliage being included therein.

It has been found that a mixture of different types of live foliage is acceptable in the habitat as well as a mixture of artificial and/or dried foliage. All of the same type of foliage, of course, also works well.

From the above it can be seen that the present invention has the advantage of providing a relatively inexpensive, attractive nesting habitat for the small, interesting-to-watch, pleasant sounding Carolina wren. These habitats are highly efficient in attracting wrens and can be disposed under any suitable overhang.

The present invention can, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. An artificial bird nesting habitat comprising: an open vessel means; a nesting chamber means having sides and being centrally disposed within said vessel means; foliage support material disposed within said vessel means and surrounding the sides of said nesting chamber means; and foliage like means mounted in and extending upwardly and outwardly from said support material whereby a relatively secure habitat is provided which will attract birds to nest within said chamber.

2. The nesting habitat of claim 1 wherein said vessel means is of the hanging basket type.

3. The nesting habitat of claim 1 wherein said foliage like means is chosen from live foliage, cut foliage, dried foliage and artificial foliage.

4. The nesting habitat of claim 1 wherein the vessel like means is approximately ten to twelve inches across.

5. The nesting habitat of claim 4 wherein the nesting chamber is between two and one-half and four inches across.

6. The nesting habitat of claim 1 wherein the foliage support material is of the type that will support living plants.

7. The nesting habitat of claim 6 wherein at least a portion of the foliage like means is composed of growing plants.

8. The nesting habitat of claim 1 wherein said foliage support material is formed from florist oasis material.

9. The nesting habitat of claim 8 wherein at least a portion of said foliage like means is artificial foliage.

10. The nesting habitat of claim 8 wherein at least a portion of said foliage like means is dried foliage.

11. The nesting habitat of claim 8 wherein at least a portion of said foliage like means is cut foliage.

* * * * *